US010646780B2

(12) United States Patent
Laulund et al.

(10) Patent No.: US 10,646,780 B2
(45) Date of Patent: May 12, 2020

(54) GAME SYSTEM

(71) Applicant: LEGO A/S, Billund (DK)

(72) Inventors: Jens Valentin Laulund, Hedensted (DK); Joakim Kørner Nielsen, Vejen (DK); Morgan James Walker, Aarhus (DK); Bjarke Pedersen, Vejle (DK)

(73) Assignee: LEGO A/S (DK)

( * ) Notice: Subject to any disclaimer, the term of this patent is extended or adjusted under 35 U.S.C. 154(b) by 166 days.

(21) Appl. No.: 15/515,229

(22) PCT Filed: Sep. 29, 2015

(86) PCT No.: PCT/EP2015/072394
§ 371 (c)(1),
(2) Date: Mar. 29, 2017

(87) PCT Pub. No.: WO2016/050757
PCT Pub. Date: Apr. 7, 2016

(65) Prior Publication Data
US 2017/0225073 A1    Aug. 10, 2017

(30) Foreign Application Priority Data

Oct. 2, 2014 (DK) .................................. 2014 70605
Mar. 31, 2015 (DK) .................................. 2015 70192
Apr. 8, 2015 (DK) .................................. 2015 70203

(51) Int. Cl.
*A63F 13/55* (2014.01)
*A63F 13/428* (2014.01)
(Continued)

(52) U.S. Cl.
CPC ............ *A63F 13/428* (2014.09); *A63F 13/20* (2014.09); *A63F 13/40* (2014.09); *A63F 13/525* (2014.09);
(Continued)

(58) Field of Classification Search
CPC .... A63F 13/235; A63F 13/825; A63F 13/525; A63F 13/55; A63H 2200/00
See application file for complete search history.

(56) References Cited

U.S. PATENT DOCUMENTS 3,005,282 A    10/1961    Christiansen
5,190,285 A    3/1993    Levy et al.
(Continued)

FOREIGN PATENT DOCUMENTS

CN    101675458 A    3/2010
EP    1271415 A1    1/2003
(Continued)

OTHER PUBLICATIONS

Danish Patent and Trademark Office's Search Report and Opinion for corresponding application No. PA 2014 70605, dated Apr. 30, 2015.
(Continued)

*Primary Examiner* — Jay Trent Liddle
*Assistant Examiner* — Alex F.R.P. Rada, II
(74) *Attorney, Agent, or Firm* — Day Pitney LLP

(57) ABSTRACT

A game system comprising a data processing system and an identification toy element that includes information associated with the identification toy element; wherein the identification toy element is a toy construction element comprising one or more connectors configured for mechanically connecting one or more other toy construction elements to the identification toy element so as to allow a user to construct a toy construction model; and wherein the data processing system is configured to: detect a presence of the identification toy element in a detection area; create an association between a virtual object in a virtual environment and the detected identification toy element; access, when the identification toy element is again placed within a detection (Continued)

area, the information associated with the identification toy element; obtain, based on the accessed information, information about the virtual object associated with the identification toy element; present a representation of the associated virtual object; and to perform a play pattern procedure including controlling the representation of the virtual object.

23 Claims, 4 Drawing Sheets

(51) Int. Cl.
  A63H 33/08 (2006.01)
  A63F 13/65 (2014.01)
  A63F 13/20 (2014.01)
  A63F 13/40 (2014.01)
  A63F 13/525 (2014.01)
  A63F 13/77 (2014.01)
  A63F 13/235 (2014.01)
  A63F 13/45 (2014.01)
  A63F 13/73 (2014.01)
  A63F 13/825 (2014.01)

(52) U.S. Cl.
  CPC .............. A63F 13/55 (2014.09); A63F 13/65 (2014.09); A63F 13/77 (2014.09); A63H 33/086 (2013.01); A63F 13/235 (2014.09); A63F 13/45 (2014.09); A63F 13/73 (2014.09); A63F 13/825 (2014.09); A63F 2300/10 (2013.01); A63F 2300/1031 (2013.01); A63F 2300/1062 (2013.01); A63F 2300/1075 (2013.01); A63F 2300/609 (2013.01); A63H 2200/00 (2013.01)

(56) References Cited

U.S. PATENT DOCUMENTS

| | | |
|---|---|---|
| 5,766,077 A | 6/1998 | Hongo |
| 5,853,327 A | 12/1998 | Gilboa |
| 6,290,565 B1 | 9/2001 | Galyean, III et al. |
| 6,549,933 B1 | 4/2003 | Barrett et al. |
| 6,650,870 B2 | 11/2003 | White et al. |
| 7,081,033 B1 | 7/2006 | Mawle et al. |
| 7,092,988 B1 | 8/2006 | Bogatin et al. |
| 7,439,972 B2 | 10/2008 | Timcenko |
| 7,596,473 B2 | 9/2009 | Hansen et al. |
| 7,639,231 B2 | 12/2009 | Parry et al. |
| 7,843,471 B2 | 11/2010 | Doan et al. |
| 7,993,201 B2 | 8/2011 | Matsumoto et al. |
| 8,033,901 B2 | 10/2011 | Wood |
| 8,257,157 B2 | 9/2012 | Polchin |
| 8,705,845 B2 | 4/2014 | Doucet et al. |
| 8,847,964 B2 | 9/2014 | Peterson |
| 9,597,583 B2 | 3/2017 | Loetz et al. |
| 9,761,036 B2 | 9/2017 | Rzeszotarski et al. |
| 2002/0196250 A1* | 12/2002 | Anderson ............... G06T 19/00 345/420 |
| 2006/0030410 A1 | 2/2006 | Stenton et al. |
| 2007/0063997 A1 | 3/2007 | Scherer et al. |
| 2008/0228450 A1 | 9/2008 | Jakobsen et al. |
| 2008/0291216 A1 | 11/2008 | Cheng et al. |
| 2009/0315258 A1 | 12/2009 | Wallace et al. |
| 2010/0164953 A1 | 7/2010 | Wouhaybi et al. |
| 2011/0028219 A1 | 2/2011 | Heatherly et al. |
| 2011/0098092 A1 | 4/2011 | Reiche, III |
| 2011/0164029 A1 | 7/2011 | King et al. |
| 2011/0298922 A1 | 12/2011 | Horovitz et al. |
| 2012/0052934 A1 | 3/2012 | Maharbiz et al. |
| 2012/0244922 A1 | 9/2012 | Horovitz |
| 2012/0276997 A1 | 11/2012 | Chowdhary et al. |
| 2012/0295700 A1 | 11/2012 | Reiche |
| 2012/0295703 A1 | 11/2012 | Reiche et al. |
| 2012/0295704 A1 | 11/2012 | Reiche et al. |
| 2013/0083061 A1 | 4/2013 | Mishra et al. |
| 2013/0120355 A1 | 5/2013 | Pushkar et al. |
| 2013/0196766 A1 | 8/2013 | Leyland et al. |
| 2013/0217295 A1 | 8/2013 | Karunaratne |
| 2013/0225296 A1 | 8/2013 | Kim |
| 2013/0231193 A1 | 9/2013 | Heatherly et al. |
| 2013/0288563 A1 | 10/2013 | Zheng et al. |
| 2014/0002493 A1 | 1/2014 | Mitchell et al. |
| 2014/0015813 A1 | 1/2014 | Numaguchi et al. |
| 2014/0015832 A1 | 1/2014 | Kozko et al. |
| 2014/0055445 A1 | 2/2014 | Cook |
| 2014/0057527 A1 | 2/2014 | Fessenmaier |
| 2014/0121008 A1 | 5/2014 | Canessa |
| 2014/0162785 A1 | 6/2014 | Reiche et al. |
| 2014/0171201 A1 | 6/2014 | May et al. |
| 2014/0179446 A1 | 6/2014 | Zuniga et al. |
| 2014/0197991 A1 | 7/2014 | Mkrtchyan et al. |
| 2014/0364240 A1* | 12/2014 | Leyland ................ A63H 3/003 463/43 |
| 2015/0042757 A1 | 2/2015 | Goodman et al. |
| 2015/0151212 A1* | 6/2015 | Akavia .................... A63H 3/36 446/484 |
| 2016/0193537 A1 | 7/2016 | May |

FOREIGN PATENT DOCUMENTS

| | | |
|---|---|---|
| EP | 1 776 990 A2 | 4/2007 |
| EP | 2 317 720 A1 | 5/2011 |
| GB | 2 330 540 A | 4/1999 |
| GB | 2365796 A | 2/2002 |
| JP | H0947575 A | 2/1997 |
| JP | 2003135847 A | 5/2003 |
| JP | 2006068140 A | 3/2006 |
| JP | 2008104771 A | 5/2008 |
| JP | 2009247375 A | 10/2009 |
| JP | 2011234971 A | 11/2011 |
| WO | 1998/040815 A2 | 9/1998 |
| WO | 2004034333 A1 | 4/2004 |
| WO | 2004/101095 A1 | 11/2004 |
| WO | 2004104811 A2 | 12/2004 |
| WO | 2011017393 A1 | 2/2011 |
| WO | 2012/158836 A2 | 11/2012 |
| WO | 2012160055 A1 | 11/2012 |
| WO | 2013186769 A1 | 12/2013 |
| WO | 2014/093247 A1 | 6/2014 |
| WO | 2014100230 A1 | 6/2014 |
| WO | 2015/185629 A2 | 12/2015 |
| WO | 2013183328 A1 | 1/2016 |

OTHER PUBLICATIONS

Danish Patent and Trademark Office's Search Report and Opinion for related application No. PA 2014 70336, dated Dec. 16, 2014.
Danish Patent Office's Search Report for related DK application No. PA 2014 70336, dated Dec. 4, 2014.
Danish Patent Office's Search Report for related DK application No. PA 2014 70337, dated Dec. 3, 2014.
International Search Report issued in related international application No. PCT/EP2015/062381, dated Feb. 19, 2016.
Written Opinion issued in related international application No. PCT/EP2015/062381, dated Feb. 19, 2016.
International Preliminary Report on Patentability in related international application No. PCT/EP2015/062381, dated Oct. 11, 2016, together with amended sheets of claims, filed on Mar. 17, 2016 and Sep. 21, 2016.
Miller et al., "Interactive 3D Model Acquisition and Tracking of Building Block Structures", IEEE Transactions on Visualization and Computer Graphics, 18:4, Apr. 1, 2012.
Smith, "Bricksmith—virtual Lego modeling for your Macintosh", May 27, 2014. Retrieved from internet: Sep. 15, 2015: URL:<https://web.archive.org/web/20140527114446/http://blicksmith.sourceforge.net>.
USPTO Non-Final Office Action issued in related U.S. Appl. No. 15/314,407, dated May 2, 2018.

(56) References Cited

OTHER PUBLICATIONS

International Search Report, issued in corresponding application No. PCT/EP2015/072394, dated Jan. 5, 2016.
Written Opinion of the International Search Authority, issued in corresponding application No. PCT/EP2015/072394, dated Jan. 5, 2016.
Notification of Transmittal with International Preliminary Report on Patentability, issued in corresponding application No. PCT/EP2015/072394, dated Dec. 21, 2016.
Non-Final Office Action issued in related U.S. Appl. No. 15/314,407, dated Dec. 28, 2018.
First Office Action issued in corresponding Chinese application No. 201580063744.0, dated Mar. 4, 2019.
Final Office Action issued in related U.S. Appl. No. 15/314,407, dated Jun. 27, 2019.
European Office Action issued in corresponding patent application No. EP 15 771 588.9, dated Oct. 18, 2019.
Notice of Allowance and Allowability including references issued in related U.S. Appl. No. 15/314,407, dated Oct. 31, 2019.
Original Notice of Reasons for Refusal issued in corresponding Japanese Patent Application No. 2017-518077, dated Sep. 20, 2019.
English language Translation of Notice of Reasons for Refusal issued in corresponding Japanese Patent Application No. 2017-518077, dated Sep. 20, 2019.

* cited by examiner

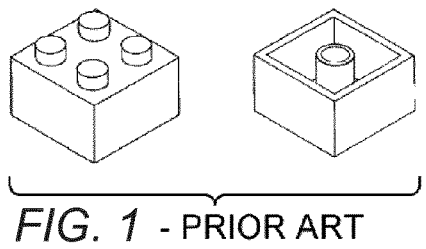
*FIG. 1* - PRIOR ART
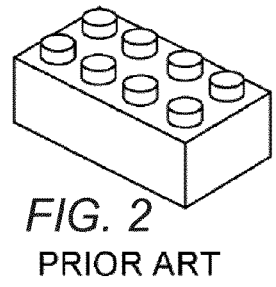
*FIG. 2*
PRIOR ART
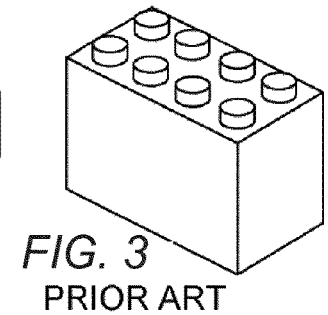
*FIG. 3*
PRIOR ART
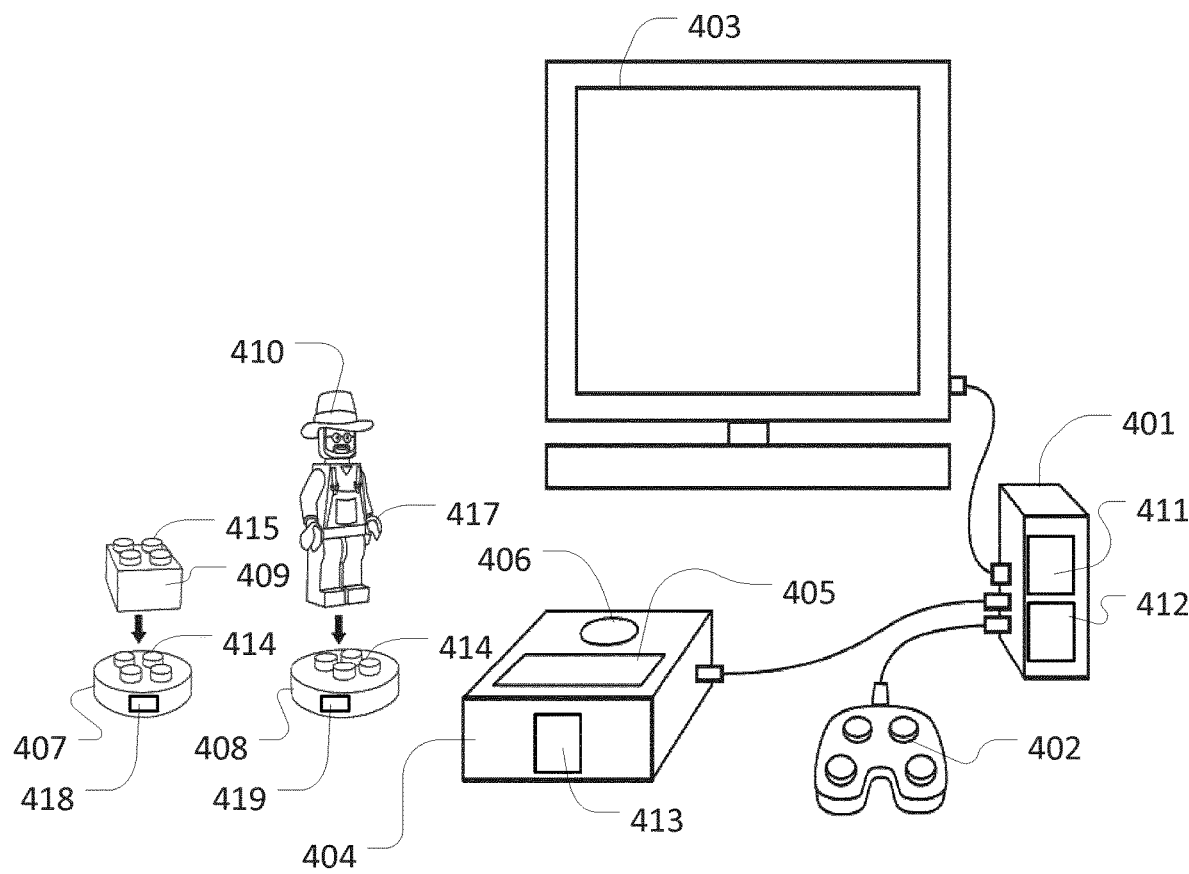
*FIG. 4*

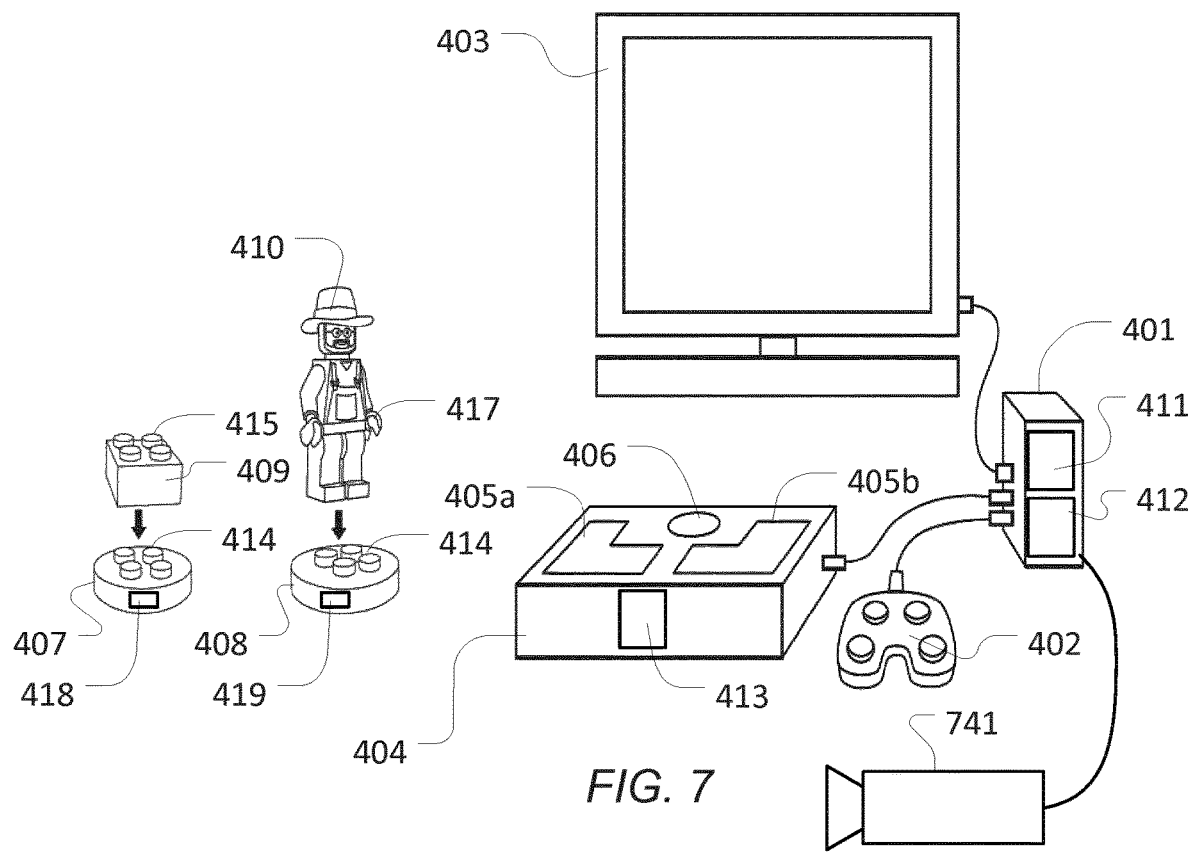
FIG. 7
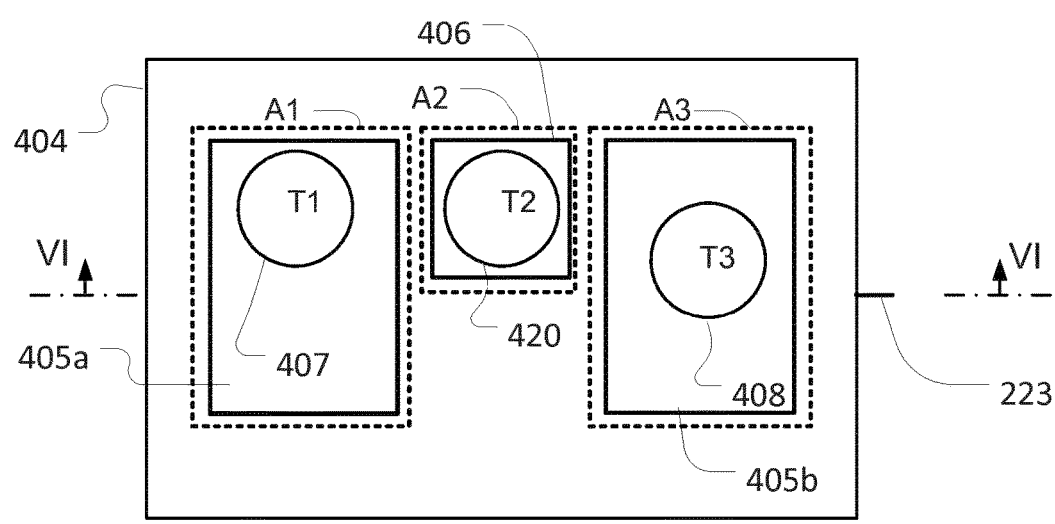
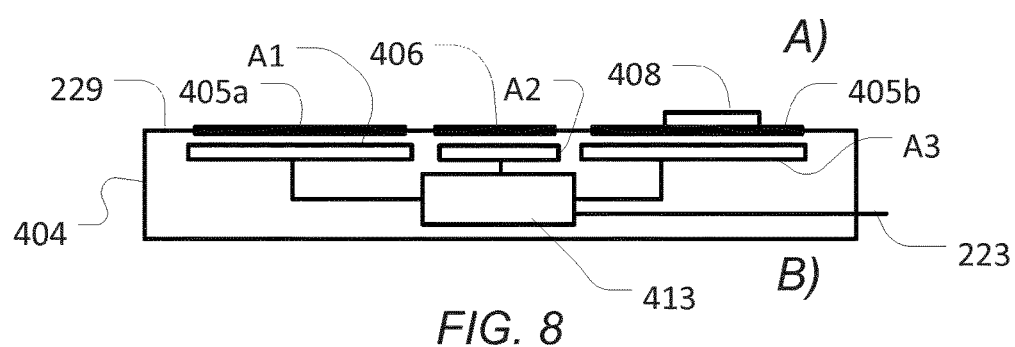
FIG. 8

GAME SYSTEM

CROSS-REFERENCE TO RELATED APPLICATIONS

This application is a U.S. National Stage of International Application No. PCT/EP2015/072394, filed on 29 Sep. 2015 and published on 7 Apr. 2016, as WO 2016/050757 A1, which claims the benefit of priority to Danish Patent Application No. PA 2014 70605, filed on 2 Oct. 2014; Danish Patent Application No. PA 2015 70192, filed on 31 Mar. 2015; and Danish Patent Application No. PA 2015 70203, filed on 8 Apr. 2015.

FIELD OF THE INVENTION

The invention relates to game systems and to methods and apparatus for a game system.

BACKGROUND

Game systems such as those in which a user operates a virtual character in a virtual environment have become increasingly popular among children and adult users. Various such game systems exist which may be implemented by a data processing system such as a game console, a handheld game device, a desktop computer, a portable computer, a tablet computer or mobile phone. It is generally desirable to make such systems increasingly interesting, entertaining and/or educational.

Several attempts have been made to control virtual game play by means of physical toys. For example, UK patent application GB 2365796 discloses a game system which comprises a toy which stores toy information, a reader for detecting the toy information by a contact-less data transmission system, and a game device. The game device executes a game in which a character representing the toy appears in accordance to the toy information detected by the reader.

In many game systems, a variety of virtual objects may become available to the player during game play, e.g. when virtual objects evolve to more advanced objects, when a player obtains virtual equipment, etc. Hence, during virtual game play, it is desirable to be able to represent different virtual objects by corresponding physical objects. It would thus be desirable to provide the user with a flexible mechanism that allows the user to obtain physical objects that resemble selected ones of a large number of different virtual objects.

SUMMARY

According to a first aspect, disclosed herein is a game system comprising a data processing system and an identification element that includes, or is configured to include, information associated with the identification toy element; wherein the data processing system is configured to:
- detect a presence of the identification element within a detection area, e.g. when the identification toy element is placed within the detection area;
- create an association between a virtual object in a virtual environment and the detected identification element;
- access, when the identification element is again placed within a detection area, the information associated with the identification element;
- present a representation of the associated virtual object based on the accessed information; and
- perform a play pattern procedure including controlling the representation of the virtual object.

Hence, the game system can easily be maintained e.g. when new types of virtual objects are added, as existing identification toy elements may be reused.

The identification element may be an identification toy element. In some embodiments, the identification toy element is a toy construction element comprising one or more connectors configured for mechanically connecting one or more other toy construction elements to the identification toy element so as to allow a user to construct a toy construction model. Accordingly, a user may change the visual appearance of the physical toy construction model that is connected to the identification toy element by attaching one or more toy construction elements to the identification toy element. Consequently, the user may adapt the visual appearance of the toy construction model so as to make it more easily recognizable for the user which virtual object a given physical object corresponds to.

Moreover, a given identification toy element does not need to have any easily recognizable, specific appearance but may be provided as a generic element which the user may easily customize. This reduces manufacturing costs of the identification toy elements.

Embodiments of the resulting system further provide an interesting game play, as the user may be provided with a high degree of freedom of designing the physical objects to be detected by the game system.

In many game systems or other applications, physical objects are employed that have stored thereon information which may be read by a reader when the physical object is within a detection area of the reader. In particular, RFID tags have been found useful for many applications as a convenient identification and storage medium. In many applications it is desirable to read information from a memory included in such an object and to write information to the memory of the object. For example, in the context of a game system—e.g. the game system according to the first aspect—a given tag may initially represent a first virtual object within a game. As the game progresses, it may be desirable to store data on the tag, such as information associating the tag to a different virtual object, information regarding progress in the game, and/or other game-related data.

However, such a system involves the risk that the user inadvertently overwrites information on a tag or otherwise writes data to the wrong tag. This risk is particularly pronounced when the user is a child or an inexperienced user or when the system requires handling of multiple tags, e.g. multiple tags that represent different virtual objects in a game.

According to a second aspect, disclosed herein is a game system comprising a data processing system and an identification element, such as an identification toy element, the identification element comprising a memory for storing information relating to the game system, wherein the data processing system comprises a detection device defining a first detection area; and wherein the data processing is configured to detect a presence of the identification element within the first detection area and to receive information stored in the memory of the identification element when the identification element is placed within the first detection area; wherein the first detection area is operable as a read-only detection area;

and wherein the detection device defines a second detection area, different from the first detection area, wherein the data processing system is configured to store data in the memory of the identification element when the identification element is placed within the second detection area.

Consequently, when the first and second detection areas of the detection device are different from each other and as the first detection area is a read-only detection area operable only for reading data from a memory of an identification element while the second detection area is used for writing data to the memory of an identification element, the risk of inadvertently writing data to an identification element is reduced. For example, if a user merely intends to read data from a given identification element, the user may place the identification element on the first detection area without running the risk of writing data to the identification element. Only when the user positions an identification element within the second detection area, which may be regarded as a designated writing area, data can be written to that identification element.

In the following, several embodiments of the aspects described above and further aspects described below will be explained in more detail.

The toy construction elements may be toy construction elements of a toy construction system that comprises one or more different types of mutually interconnectable toy construction elements. The toy construction elements may be elements of an existing toy construction system. Hence, the user may reuse existing toy construction elements to construct physical objects which correspond to virtual objects in a virtual environment. Nevertheless, the game system may comprise a plurality of toy construction elements, each comprising one or more connectors configured for detachably/releasably interconnecting the toy construction elements with each other and/or with the identification toy element. For example, a toy construction set may comprise toy construction elements in a sufficient number, shape and size so as to allow a user to construct toy construction models that resemble one or more virtual objects of a game system.

In some embodiments, one or more of the toy construction elements have a top surface, a bottom surface, and connectors placed on at least one of the top and the bottom surface, so as to allow a vertical stacking of toy construction elements. Alternatively or additionally, toy construction elements may comprise connectors on one or more of its side faces so as to allow lateral/horizontal interconnection of toy construction elements. The toy construction elements may have a uniform height, or an integer multiple of a uniform height, defined between the top and bottom surfaces.

The connectors may be configured to allow interconnection of each construction element with another construction element in a discrete number of predetermined relative orientations relative to the construction element. Consequently, a large variety of possible building options are available while ensuring interconnectivity of the building elements. The connectors may be positioned on grid points of a regular grid; in particular, the connectors of the toy construction elements may be arranged such that the connectors of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

The connectors may utilise any suitable mechanism for detachably/releasably connecting construction elements with other construction elements. In some embodiments, the connectors comprise two or more types of connectors configured for a mating engagement with each other, e.g. in a plug-and-socket or male-female fashion. Different surfaces of the toy construction element may comprise respective types of connectors. In some embodiments, the connectors comprise one or more protrusions and one or more cavities, each cavity being adapted to receive at least one of the protrusions in a frictional engagement.

Embodiments of the toy construction system allow a user to construct a large variety of toy construction models in a uniform and well-structured manner and with a limited set of different types of toy construction elements. In some embodiments, the game system comprises a plurality of toy construction elements and the virtual object resembles a toy construction model constructable from the plurality of toy construction elements. Consequently, the user may construct a toy construction model including the identification toy element such that the construction model resembles the virtual object it is associated with. The user may thus easily recognise which virtual object a physical toy construction model represents. It will be appreciated that the degree of resemblance may vary. For example, the representation of the virtual object presented by the data processing system may depict a construction model constructed from toy construction elements. In some embodiment the representation of the virtual object may depict a toy construction model constructed from the same construction elements as included in the game system for construction of the toy construction model, optionally with or without a representation of the identification toy element. In other embodiments the representation of the virtual model may depict a larger model constructed from a larger number of toy construction elements providing a more detailed or realistic shape of a given object. In yet other embodiments, the virtual representation may be depicted as an animated object without depicting individual toy construction elements.

The data processing system and, in particular, a detection device of the data processing system may use any suitable mechanism for detecting the presence of an identification toy element within a detection area. The detection mechanism may require electrical connection of the identification toy element or it may be a contact-less detection mechanism, e.g. based on capacitive detection, inductive detection, detection by a camera, detection based on radio-frequency signals, optical detection and/or another detection technology and/or a combination of two or more of the above or of other technologies. The size and/or shape of the detection area is normally defined by the detection technology employed and by the detection device implementing the detection technology. The detection device may be an integral part of the data processing system or a separate device connectable to the data processing system, e.g. a computer peripheral. For the purpose of the present description the detection device will also be referred to as a reader, as some embodiments of the detection device also perform the accessing of the information associated with the identification toy element. The detection device may comprise an electrical connector for electrically connecting the identification toy element; alternatively, the detection device may comprise an antenna or other sensor for contact-less detection of the identification toy element. In the first example, the detection area may thus be defined by the electrical connector while the detection area in the second example may be defined by the reception range of the antenna or other contact-less sensor. The detection device may define a detection surface on which the identification toy element may be placed for the purpose of detection; in some embodiments, the detection device may be configured to only detect the identification toy element when it is positioned in contact with the surface and/or within a close proximity of the surface, e.g. within 10 cm or less from the surface, such as 5 cm or less, such as 2 cm or less, such as 1 cm or less. Accordingly, in some embodiments the detection surface may be referred to as a contact surface. Said surface, or a part of the surface, may thus define the detection area. In other embodiments, the detection area may be larger than and/or remote from the detection device. For example, some contact-less detection technologies allow detection of an identification element within a detection area remote from the detection device, e.g. more than 10 cm away from the detection device, such as more than 1 m away from the detection device. The detection technology may further allow the data processing system to access, via the detection device, information included in the identification toy element. Alternatively, the information access may use a separate technology; the information access technology may use e.g. a radio-frequency data communication, a wired data communication, an optical information access technology and/or the like. In some embodiments, the detection technology and/or the information access technology is a two-way technology allowing the data processing system to communicate information to the identification toy element, e.g. so as to alter, replace and/or supplement the information included in the identification toy element. In some embodiments, the detection and information access is based on near-field communication (NFC) or radio-frequency identification (RFID).

In some embodiments, the detection device comprises a processor and/or other circuitry implementing the detection mechanism and a communications interface with the identification toy element. The processor and/or other circuitry may further implement a communications interface with the data processing system. The detection device may comprise connectors for mechanically connecting the toy construction elements to the detection device so as to allow a user to construct a toy construction model which includes the detection device as an integral part, e.g. a model resembling a landscape, an arena, a portal or other structure associated with the virtual environment. Hence placing a toy construction model with an identification toy element within the detection area of the detection device resembles placing the toy construction model within a landscape, arena etc. In some embodiments, the detection device may e.g. be embodied as an RFID reader of a processing device, such as a smartphone.

The data processing system may be configured to create the association at least in part responsive to a game event, e.g. responsive to a user input such as a user input indicative of a selection of a virtual object. The game event may include an unlocking of a new virtual object, such as an evolved variant of a current virtual object or an entirely new type of virtual object. A game event may involve the game having reached a certain stage, a player having obtained a certain number of credits, in-game currency or other type of rewards, etc., a user selecting a new virtual object from a list of available virtual objects, and/or the like. In some embodiments the data processing system is configured, responsive to a game event, to replace an existing association between the identification toy element and a virtual object with a new association between a new virtual object and the identification toy element such that the data processing system presents a representation of said new virtual object and performs a play pattern procedure including controlling the representation of the new virtual object when the data processing system again (i.e. after the creation of the association) detects the presence of the identification toy element within a detection area, e.g the first detection area. Consequently, a user may associate the identification toy element with successive virtual objects. The user may thus selectively construct different toy construction models using the identification toy element, each toy construction model having a respective virtual object associated with it. The information included in the identification element—e.g. stored in the memory of an identification element—may be indicative of the association. Hence, creating an association may comprise storing information indicative of the association in the memory of the detected identification element, e.g. by storing an identifier identifying an associated virtual object in the memory of the detected identification element.

In some embodiments, the system comprises a scanning device configured to acquire information indicative of the visual appearance of a physical object, such as a toy; wherein the data processing system is configured to create the virtual object with a representation based on the acquired information. In particular, the scanning device may be an optical scanning device. Hence, the user has a great freedom in creating virtual objects having customized appearances. As the virtual object is associated with a toy identification element, the virtual object can subsequently be triggered to appear in the virtual environment without having to again acquire the information about the appearance of the virtual object.

When the physical object is attachable to the identification toy element, the user can create a physical object having a user-defined appearance and that is easily recognisable by the data processing system once a corresponding virtual object has been associated with the toy identification element. For example, the physical object may be a toy construction model constructed from toy construction elements that have connectors which are connectable to corresponding connectors of the toy identification element.

The scanning device may e.g. be a digital camera, e.g. a built-in camera of a computer and the acquisition of the visual appearance of the physical object may comprise taking one or more pictures of the object. The scanning device may be connected to or even integrated into the data processing system such that the data processing is operable to receive the acquired pictures and/or other scanning data. For example, the scanning process and the process for creating a virtual object may be performed as described in international patent application no. PCT/EP2015/062381.

In other embodiments, the scanning device may comprise a depth camera and the information indicative of the appearance of the object may comprise depth information. In yet further embodiments the scanning device may include a 3D scanner, e.g. as described in US 2015/042757.

The scanning process may be performed before or after attaching the object to the identification toy element. In some embodiments, the scanning process is performed when the physical object attached to the toy identification element is placed within a detection area of the detection device.

In some embodiments, creating the virtual object may comprise adding game-related attributes and/or game-related behavioural characteristics to the virtual object. The data processing system may add such attributes and/or behaviour based on user input, e.g. by presenting a selection menu allowing a user to select certain attributes/behaviour to be added. In some embodiments, the data processing system may even be configured to add one or more attributes or behavioural characteristics automatically, e.g. based on the received information about the appearance of the physical object. To this end, the data processing system may detect one or more features or visual characteristics of the physical objects, e.g. a shape, a size a color, the presence or absence of certain features, and/or the like. The data processing system may then add certain behavioural features based on the detected features or visual characteristics of the physical objects. An example of a process for adding behaviour to a virtual object based on detected visual characteristics of a physical object is described in International patent application no. PCT/EP2015/062381.

The various aspects described herein may be implemented with a variety of computer-generated virtual environments in which virtual objects are controlled by a data processing system. Generally, a virtual object may be an animate or an inanimate object. The virtual object may be a completely autonomous object or an object whose actions are partly or completely responsive to user inputs. Examples of inanimate virtual objects include a building, a vehicle, a weapon or other accessory or equipment, etc. A virtual object may be stationary or movable within the virtual environment. For example, an object may be carried, worn or otherwise moved by a virtual character and/or controlled to be moved by the user, e.g. a car or other vehicle being controlled in a car racing game. A virtual object may comprise movable parts, such as doors, or the like and/or other modifiable parts.

A virtual object may represent a virtual character or other animate object, such as a human-like character, an animal-like character, a fantasy creature, etc. In some embodiments, virtual objects whose counterparts in the physical world are inanimate—e.g. a car—may be used as an animate virtual object or character in a virtual environment. Hence, in some embodiments the virtual object is a virtual character and, in some embodiments, the virtual object is an inanimate object.

A virtual character may exhibit behaviour by moving around within the virtual environment, by interacting with, or engaging, other virtual characters and/or inanimate virtual objects present in the virtual environment and/or the virtual environment itself and/or by otherwise developing within the virtual environment, e.g. growing, aging, developing or loosing capabilities, attributes or the like. Generally, virtual objects may have attributes, e.g. one or more capabilities that influence the game play or other evolution of a virtual environment. For example, a car may have a certain maximum speed, or an object may have an attribute that determines whether or how a virtual character may interact with the virtual object, and/or the like.

Hence, a computer-generated virtual environment may be implemented by a computer program executed on a data processing system and causing the data processing system to generate a virtual environment and to simulate the evolution of the virtual environment over time, including the behaviour of one or more virtual characters and/or the attributes of one or more virtual objects within the virtual environment. A computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the data processing system may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof.

The game system may present a representation of the virtual environment including a representation of one or more virtual objects such as virtual characters within the virtual environment. The virtual environment and/or the virtual objects may be presented as two or three-dimensional graphical representations on a display of the data processing system. A user may access a computer-generated virtual environment so as to view the graphical presentation and/or so as to interact with the computer-generated virtual environment. In some embodiments, the virtual object is represented as a representation of a three-dimensional toy model composed from a number of interconnected toy construction elements. In some embodiments, the representation comprises a three-dimensional representation viewable using a 3D enabled device such as a 3D viewer.

The information associated with the identification toy element may include an identifier of the identification toy element. The data processing system may thus create an association to a virtual object by storing the identifier in association with an identifier of the virtual toy construction element. The data processing system may store this association in a storage device of the data processing system or otherwise accessible by the data processing system. The storage medium of, or accessible by, the data processing system may be a memory or storage device included in, or connected to, the data processing system. Alternatively or additionally, the data processing system may store an identifier of the virtual object in a memory of the identification toy element. Hence, creating an association may comprise storing an identifier of the virtual object in a memory of the identification toy element In other embodiments, the association may be created by storing an identifier of the identification toy element in a memory of the data processing system or associated with the data processing system. However, when the association is created by storing an identifier of the virtual object in a memory of the identification element this operation does not require that the data processing accesses the information previously stored on the identification toy element. Moreover, the association does not have to be maintained by the data processing system. The memory of the identification toy element may comprise any suitable storage medium, such as an EPROM, EEPROM, NVRAM, flash memory, etc., or another suitable type of memory or a combination of more than one memory types. The memory may be read-only or rewritable.

In some embodiments, the information associated with the identification toy element may include information about the virtual object such as an identifier of the virtual object, an attribute of the virtual object, and/or the like. The data processing system may thus create an association to a virtual object by storing the information about the virtual object in a memory of the identification toy element. For example, the memory of the identification toy element may include an identifier of a virtual object associated with the identification toy element. Consequently, in some embodiments the identification toy element initially only includes an identifier of the identification toy element itself, or even only a default identifier or an identifier identifying the identification toy element as a part of the game system. Creating the association between the virtual object and the identification toy element by the data processing system may then include storing information indicative the virtual object or otherwise indicative of the created association onto the identification toy element.

In some embodiments the data processing system is configured to present building instructions for constructing, from the toy construction elements of the game system, a toy construction model resembling or otherwise representing the virtual object and connectable to the identification toy element. Consequently, the game system provides guidance assisting the user in constructing a toy construction model that resembles or otherwise represents the virtual object. The building instructions may be presented in any suitable form, e.g. as an animation, a video, a series of pictures, as text, and/or a combination of the above. For example, the building instructions may be presented responsive to a game event and/or a user input.

A game system may comprise multiple identification toy elements and multiple toy construction elements which allow the user to construct multiple toy construction models for use in the game system. However, it may be desirable to limit the user's freedom to freely use any identification toy element at any point of the game play. For example, the user may otherwise choose to dismantle a previously constructed toy construction model and reuse the corresponding identification toy element for the purpose of constructing a new toy construction model resembling a recently unlocked virtual object. However, the user may later need the now dismantled toy construction model to complete the game play, as in some embodiments, use of a virtual object may be conditioned on detection of an identification toy element to which the virtual object has been associated. Hence, the user may need to create a corresponding new association with an identification toy element to be able to use a virtual object again, thus resulting in a potentially frustrating game experience. In some embodiments, the game system comprises a first and a second identification toy element each including information associated with the respective identification toy element; wherein the data processing system is configured to unlock/enable one or more new virtual objects responsive at least to detecting the first identification toy element; wherein the second identification toy element comprises one or more connectors configured for connecting one or more toy construction elements to the second identification toy element so as to allow a user to construct a toy construction model; and wherein the data processing system is configured to create an association between one of the unlocked virtual objects and the second identification toy element responsive at least to detecting the first and the second identification toy elements in the same or in different detection areas. Consequently, the system provides a mechanism for effectively guiding the user in using selected identification toy elements of a set of identification toy elements. In particular, as creating the association with the second identification toy element requires the presence also of the first identification toy element (which has an existing association), inadvertent overwriting of the existing association may be prevented. In some embodiments, the first identification toy element is associated to a virtual character while the second identification toy element is associated with an inanimate object, such as an accessory for use by the virtual character.

In some embodiments, the game system comprises a detection device defining a first detection area and a second detection area, different from the first detection area. The detection device may be configured to access information associated with an identification toy element detected within the first detection area; the detection device may further be configured to transmit information associated with an identification toy element to an identification toy element detected within the second detection area for storage of the transmitted information by the identification toy element. Hence, the first detection area may be a read area, e.g. a read-only area, while the second detection area may be a write area, e.g. a read-write or a write-only area. At least some of the identification toy elements may be operable to be selectively placed on each of the detection areas and to interact with the detection device via each of the detection areas. The provision of separate, dedicated detection areas for detecting and for writing information, respectively, reduces the risk that a user inadvertently overwrites information of an identification toy element or causes reading of an erroneous identification toy element. Alternative or additionally, this risk may further be reduced when the data processing system is configured to send information to an identification toy element for storage only when said identification toy element is positioned within the second detection area and when another, e.g. a predetermined, identification toy element is detected within the first detection area. Accordingly, in some embodiments, the game system comprises a first and a second identification element and the data processing system is configured to write information to the second identification element only when the second identification element is placed within the second detection area and when the first identification element is placed in the first detection area. In some embodiments, some identification toy elements are associated with a fixed virtual object such that the association cannot be altered by the user, e.g. by storing information about the associated virtual object in a read-only memory of the identification toy element. Other identification toy elements may be rewritable, i.e. their associations may be altered by the user. In some embodiments, the game system is configured to only allow a user to alter associations between inanimate virtual objects and identification toy element, while associations between identification toy elements and virtual characters are fixed/read-only. In some embodiments the reader defines one or more further detection areas, e.g. one or more further read-only detection areas and/or one or more at least partly write-only detection areas and/or one or more detection areas that allow both the reading and writing of game related data It will be appreciated that the read and or write restrictions of the detection areas and/or the identification element may be implemented in hardware, e.g. by electronically disabling the reading or writing, respectively. Alternatively, the read and write restrictions may be implemented by a control circuit of the detection device and/or by software executed on the data processing system.

In some embodiments, the data processing system is operable, when an identification element is placed within the second detection area, to write at least one predetermined type of information and/or to write to one or more predetermined memory area(s) of the memory of the identification element without having read a current version of said predetermined type of information from said memory and/or information from said predetermined memory area(s). Hence, the second detection area may at least partly be operated as a write-only detection area such that the processing system is only operable to write to the memory but not operable to read from the memory. In some embodiments, the second detection area may be selectively be operated in different modes, e.g. in a write-only mode and in a ready-only mode. Such a write-only restriction may be implemented for the entire contents of the memory or only to some contents, e.g. the contents of certain memory areas or to content of a certain type. For example, it will be appreciated that, in addition to the game-related payload data, such as game status information, character information, character properties, abilities, sounds, image data, etc., an identification element may further comprise certain data, e.g. a device ID or communications ID which is read by the reader even when the identification element is placed within the second detection area. For example, the identification element may have stored thereon an identifier and/or protocol data for use by the reader during the writing process, e.g. so as to be able to correctly address the identification element and/or in order to write the data in the correct format, at a suitable memory location or the like. Nevertheless, in some embodiments, the identification element includes at least one memory location for storing game-related data which the data processing system is operable to write to but not to read from (other than as part of the writing process, e.g. so as to verify that the data has been written correctly) when the identification element is placed within the second detection area; and where the data processing system is operable to read the game-related data from said memory location, but not write game related data to said memory location, when the identification element is placed within the first detection area. It will further be appreciated that the identification element may include further payload data, such as sound data, image data, links or addresses to websites, data repositories in the cloud, and/or the like.

In some embodiments, at least one or more of the identification elements may be selectively positioned within the first and the second detection area, i.e. the at least one or more identification element and the first and second detection areas may be shaped and sized such that each identification element may be placed within each detection area. Hence, these identification elements may be read from and written to subject to placement of the identification element within the first or second detection area. In some embodiments, the system may further comprise detection elements that are read-only, i.e. where the data processing system is not operable to write data to such a read-only identification element even if the identification element is placed within the second detection area. In some embodiments, the second detection area may even be shaped and sized such that only writable identification elements may be placed within the second detection area. In yet alternative embodiments, different identification elements may comprise one or more read-only items of information and one or more readable and writable items of information.

In some embodiments, the identification toy element has the form of a base plate for supporting a toy construction model and for placement of the toy construction model within a detection area of the game system. The base plate may comprise one or more connectors on its upper surface allowing a user to position and connect one or more toy construction elements on top of the base plate. The base plate may include an electronic circuit including, e.g. including one or more of the following: a processor, and antenna, a memory, an RFID circuit, and/or the like.

The data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA, a game console, a game device, a smart TV, an Android stick, or another programmable computing device having a graphical user-interface. In some embodiments, the data processing system may include a client system, e.g. including a user interface, and a host system which may create and control the virtual environment. The client and the host system may be connected via a suitable communications network such as the internet.

Here and in the following, the term processor is intended to comprise any circuit and/or device suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The present disclosure relates to different aspects including the game system and the device described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a method for operating a game system, the game system comprising a data processing system and an identification toy element that includes information associated with the identification toy element;

wherein the identification toy element is a toy construction element comprising one or more connectors configured for mechanically connecting one or more other toy construction elements to the identification toy element so as to allow a user to construct a toy construction model; and wherein the method comprises:

attaching one or more toy construction elements to the identification toy element and positioning the identification toy element within a detection area of the game system;

detecting, by the data processing system, the presence of the identification toy element in the detection area;

creating, by the data processing system, an association between a virtual object in a virtual environment and the detected identification toy element;

placing the identification toy element again within a detection area of the data processing system, detecting, by the data processing system, the presence of the identification toy element in the detection area;

accessing, by the data processing system, the information associated with the identification toy element;

presenting, by the data processing system and based on the accessed information, a representation of the associated virtual object.

According to another aspect, disclosed herein is a method for operating a game system, the game system comprising a data processing system and an identification element comprising memory for storing information relating the game system, wherein the data processing system comprises a detection device defining a first detection area; and wherein the method comprises:

detecting a presence of the identification element within the first or the second detection area;

responsive to the detected presence identifying a particular one of the detection areas as a detection area in which the identification element is positioned; and causing operation of one or more functions by the data processing system responsive at least to the identified detection area.

In some embodiments, the method comprises:

detecting a presence of the identification element within the first detection area and receiving information stored in the memory of the identification element when the identification element is placed within the first detection area;

wherein the first detection area is a read-only detection area;

wherein the detection device defines a second detection area, different from the first detection area, and wherein the method further comprises:

storing data in the memory of the identification element when the identification element is placed within the second detection area.

The present disclosure further relates to a computer program product comprising program code means adapted to cause, when executed on a data processing system, said data processing system to perform one, some or all of the steps of one or more embodiments of the methods described herein that are performed by the data processing system. In particular, the detection and identification steps may be performed by the detection device while the data processing system is configured to receive information indicative of the identified detection area and to perform a function responsive to the detected detection area.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store. Yet alternatively, the computer program may be executed by one or more remote host computers, e.g. executed directly via the internet or in the cloud, e.g. in the form of a flash game.

The present disclosure further relates to a toy construction set comprising a plurality of toy construction elements and one or more identification toy elements. The toy construction set may further comprise a storage medium having stored therein a computer program product as described herein and/or instructions to obtain or access a computer program product as described herein. For example, the instructions may be provide in the form of an internet address, a reference to an App store, or the like. Some embodiments of the toy construction set may further comprise a detection device e.g. a peripheral device connectable to a conventional computer via a wired or wireless interface such as via a USB interface, a Zigbee interface, a Wifi interface, a Bluetooth interface such a low-energy Bluetooth interface, and/or the like.

According to another aspect, disclosed herein are embodiments of a detection device—in the following also referred to as a reader—for detecting the presence of an identification element within a detection area of the reader, the reader defining at least a first and a second detection area each configured to receive at least one identification element and the reader being configured to detect which detection area an identification element is positioned in, wherein the reader comprises at least one sensor for detecting a presence of an identification element; wherein the second detection area is shaped and sized to receive a single identification element of a predetermined type and wherein the first detection area is shaped and sized to receive two or more of said identification elements. In particular, the first detection area may be at least twice as large, e.g. at least three times as large, as the second detection area. The second detection area may provide a contact surface that has a shape and size corresponding to a corresponding contact surface of the identification element, e.g. a bottom surface of the identification element. The first detection area may be formed as a recess into which the identification element snuggly fits.

In some embodiments the detection device may comprise a third detection area shaped and sized to receive two or more of said identification elements.

Hence, from the sensor signals provided by the at least one sensor the reader can determine which one of the three detection areas a detected identification element is positioned in. In some embodiments, each detection area is associated with a respective sensor detecting a presence of an identification element in said associated detection area.

The reader may be operable for use in a game system as described above in connection with the first aspect and/or for use in a different type of game system or a different type of data processing system.

In some embodiments, the reader is configured to activate and/or interrogate only one of the detection areas at a time, e.g. by activating/interrogating the sensors in an alternating pattern or cycle.

For example, in some embodiments the identification elements may be passive identification elements that do not actively emit any identification signal but that emit a response signal in response to a received inquiry signal. An example of this type of sensors is a passive RFID tag that responds to the receipt of an interrogation signal from an antenna of an RFID reader by emitting an identification signal.

In some embodiments, the detection of an identification element is based on radio-frequency communication between the reader and the identification tag. To this end the at least one sensor may comprise an antenna for emitting and/or receiving radio-frequency signals. In some embodiments, the identification elements are RFID tags such as passive RFID tags.

In some embodiments, the detection device is configured to detect a position of the identification element relative to the detection device or relative to another suitable reference, e.g. the position within one of the detection areas. For example, a detection area may further define two or more zones and the detection device may be configured to determine which zone the identification element is positioned in. Alternatively or additionally, the detection device may be configured to determine a relative position of one identification element relative to another identification element and/or a relative distance from a centre of a detection area, and/or or a position relative to another suitable reference, e.g. a reference coordinate system.

In some embodiments, the detection device comprises a plurality of sensors, each sensor comprising a coil antenna. A detection area associated with the coil antenna may be defined within a contact surface which the identification element may be brought into contact with. In particular, the detection area may be defined such that it is positioned within an area delimited by a projection of the coil antenna onto the contact surface. For example, the first detection area may be located within a surface area of a contact surface surrounded by the projection of the coil antenna of the first sensor. Similarly, the second detection area may be located within a surface area of a contact surface surrounded by the projection of the coil antenna of the second sensor. The first and second detection areas may be located spaced apart from each other.

It will be appreciated that other embodiments may use a different number of detection areas, e.g. 3, 4, or even more detection areas.

Some or all of the detection areas may be arranged substantially in a common plane, in parallel or even non-parallel planes. For example, the detection areas may be arranged on an exterior surface of a housing of the detection device, e.g. on a common side of the housing, such as a top side of a housing of a detection device. In other embodiments, the detection areas may be arranged on different exterior sides of the housing.

BRIEF DESCRIPTION OF THE DRAWINGS

FIGS. 1-3 each show a prior art toy construction element.

FIGS. 4-5 illustrate examples of a toy construction system.

FIG. 7 illustrates another example of a toy construction system.

FIG. 8 shows schematic views of a reader for detecting identification elements and for reading and writing information from/to detected identification elements. In particular, FIG. 8A shows a top view of the reader while FIG. 8B shows a cross sectional view of the reader.

DETAILED DESCRIPTION

Figure 5:
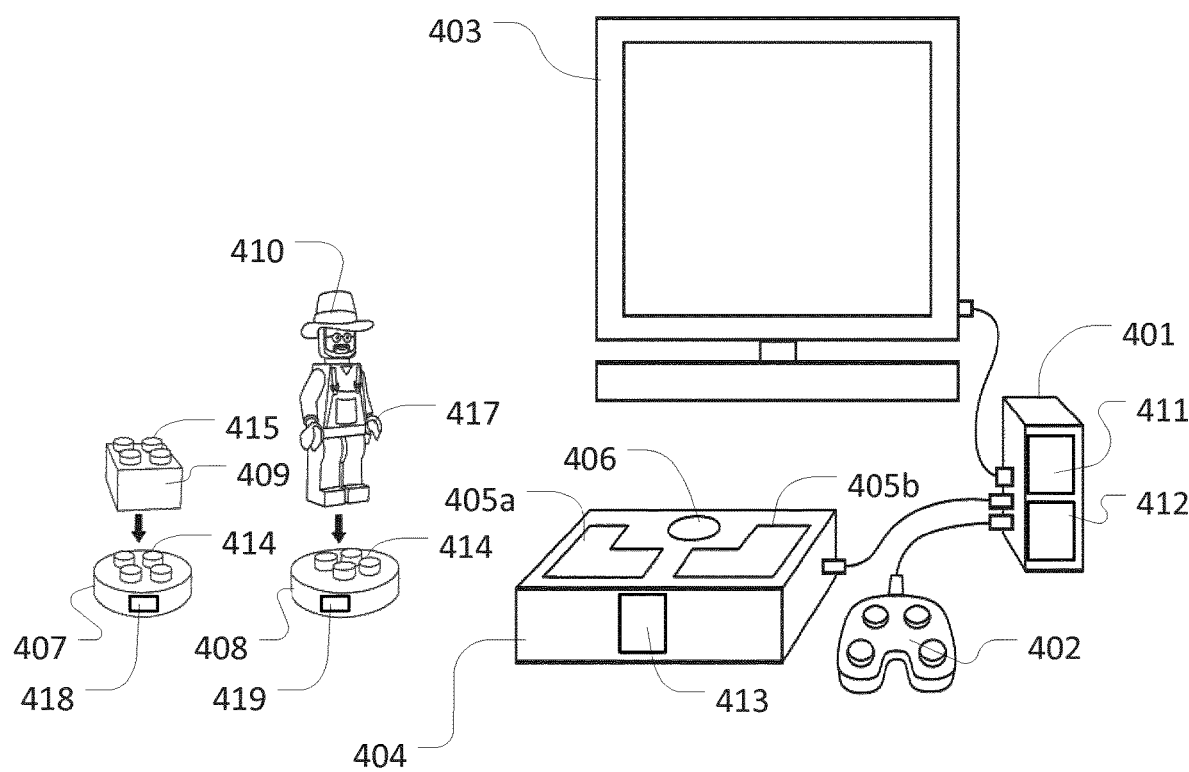

Various aspects and embodiments of game systems, detection devices and toy construction systems disclosed herein will now be described with reference to toy construction elements in the form of bricks, e.g. of the type shown in FIGS. 1 through 3. However, the various aspects disclosed herein may be applied to other forms of data processing systems and/or game systems and/or construction elements for use in toy construction sets.

In FIG. 1 is shown a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005,282. FIGS. 2 and 3 show other such prior art construction elements. The construction elements shown in the remaining figures have this known type of connectors in the form of cooperating studs and cavities. However, other types of connectors may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of connectors at coupling locations defining a regular planar grid allow the toy construction elements to be interconnected in a discrete number of positions and orientations relative two each other, in particular at right angles with respect to each other.

FIG. 4 shows an embodiment of a game system. The system comprises a computer 401, an input device 402 connected to the computer, a display 403 connected to the computer, a reader 404 connected to the computer, a number of identification toy elements 407, 408, and a number of toy construction elements 409, 410.

The computer 401 may be a personal computer, a desktop computer, a laptop computer, a handheld computer such as a tablet computer, a smartphone or the like, a game console, a handheld entertainment device, or any other suitably programmable computer. The computer 401 comprises a processor 411 such as a Central Processing Unit (CPU) and one or more storage devices 412 such as a memory, a hard disk, and/or the like.

The display 403 is operatively coupled to the computer 401 and the computer 401 is configured to present a graphical representation of a virtual environment on the display 403. Though illustrated as separate components in FIG. 4, it will be appreciated that the display may be integrated in the housing of the computer.

The input device 402 is operatively coupled to the computer 401 and is configured to receive user inputs. For example, the input device may comprise a keyboard, a mouse, or other pointing device, and/or the like. In some embodiments, the system comprises more than one input device. In some embodiments an input device may be integrated in the computer and/or the display, e.g. in the form of a touch screen. It will be appreciated that the system may comprise further peripheral computer devices operatively coupled to, such as integrated into, the computer.

The reader 404 is operable to detect one or more identification toy elements. To this end, the reader defines two detection areas 405 and 406 respectively, and the reader is operable to detect an identification toy element when positioned in one of the detection areas. The reader comprises one or more RFID circuits 413—e.g. in the form of a processing unit including one or more RFID detection circuits—and corresponding one or more antennas operable to detect an identification toy element placed on one or more of the detection areas. Alternatively, the reader may employ a different detection and data communication technology. In some embodiments the reader may be integrated in the computer and/or the display and/or the input device 402.

The identification toy elements 407 and 408 have the form of a base plate with connectors 414 on its top surface. The connectors 414 are compatible with the known construction elements described in connection with FIGS. 1-3.

However, other types of identification elements may be used. The game system further comprises one or more toy construction elements 409 and 410, e.g. of the type described in connection with FIGS. 1-3. While FIG. 4 shows two construction elements, it will be appreciated that a game system may include any number of construction elements. One of the construction elements 409 has the shape of a building block as described in connection with FIG. 1, and another construction element 410 has the shape of a human figure. Both construction elements have connectors—in this example cavities—for attachment to the connectors of the identification toy elements. Both construction elements have additional connectors 415, 417 allowing a user to connect further construction elements so as to construct a toy construction model comprising multiple construction elements.

Each of the identification toy elements comprises an RFID circuit 418, 419, respectively, operable to receive and store information. If another detection technology is used, the identification toy element may comprise a corresponding detection circuit or device. In particular, the stored information may identify a virtual object associated with the identification toy construction element. In some embodiments, one or more of the identification toy elements included in a game system may be manufactured with pre-stored information indicative of a predetermined virtual object. Alternatively or additionally, one or more identification toy elements may be manufactured without pre-stored information about any specific virtual object. In some embodiments, the game system may comprise one or more toy identification elements where the pre-stored information is read-only, i.e. where the identification toy element is associated to a fixed virtual object. For example, a game set may comprise one or more read-only identification toy elements and additionally one or more rewritable identification toy elements. The read-only and rewritable identification toy elements may be visually distinguishable from each other; for example, they may have a different size, shape, color, design, etc. The read-only identification toy elements may be associated with virtual characters of the game, while the game system may allow the user to associate the rewritable identification toy elements with inanimate virtual objects.

The display 403, the reader 404 and the input device 402 may be operationally coupled to the computer in a variety of ways. For example one or more of the above devices may be coupled to the computer via a suitable wired or wireless input interface of the computer 401, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated detection device. In particular, many tablet computers and smartphones comprise an integrated touch screen operable as a display and input device.

The computer 401 has stored thereon a program, e.g. an App or other software application, adapted to simulate a virtual environment and to create and control virtual objects as described herein.

It will be appreciated that, in some embodiments, the computer 401 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to detect identification toy elements and cause the client or the host system to create a corresponding virtual object. The host system may then add the virtual object to the virtual world and control the virtual object within the virtual world.

The user may construct respective toy construction models on top of each of the identification toy elements which each have the form of a base plate. In use, when the user places an identification toy element, e.g. with a toy construction model connected to it, on the detection area 405 of the reader, the reader detects the presence of the identification toy element and accesses the information stored in it, if any. The accessed information comprises information about which virtual object the identification toy element is associated with or the accessed information allows the computer to otherwise identify the associated virtual object. Responsive to the detection of the identification toy element in detection area 405, the computer thus creates or otherwise presents a representation of the associated virtual object in a virtual environment. In particular, the computer may create a representation of the associated virtual object on the display and/or allow the user to control or otherwise use or engage the created virtual object in the virtual environment.

When the user positions an identification toy element, e.g. with a toy construction model connected to it, within the detection area 406 of the reader, the reader detects the presence of the identification toy element and allows the user to store information about a virtual object on the identification toy element. Hence, when the user subsequently positions the identification toy element on the detection area 405, the computer creates or enables the corresponding virtual object as described above. Generally, the detection area 406 may be shaped and/or sized so as to allow a user to only position a single identification toy element on the detection area 406 so as to allow writing to only a single identification toy element at a time. It will be appreciated that detection area 405 may be shaped and sized so as to allow detection of more than one identification toy element at a time. For example, the detection area may be formed as a recess having a size and shape corresponding the shape and size of the identification elements, i.e. such that a single identification element may be placed within the recess. To this end the detection area 406 may be recessed into a top surface of the housing of the detection device. Alternatively or additionally, an elevated rim may be formed around the detection area.

FIG. 5 shows another embodiment of a game system. The system of FIG. 5 is similar to the system of FIG. 4 and comprises a computer 401, an input device 402 connected to the computer, a display 403 connected to the computer, a reader 404 connected to the computer, a number of identification toy elements 407, 408, and a number of toy construction elements 409, 410, all as described in connection with FIG. 4. The system of FIG. 5 differs from the one of FIG. 4 in that the reader comprises three detection areas: A writable detection area 406 as described in connection with FIG. 4 and two read-only detection areas 405a,b each as the detection area 405 of FIG. 4. It will be appreciated that detection areas 405a and 405b may be shaped and sized so as to allow detection of more than one identification element at a time. In the present example, the detection areas 405a and 405b are L-shaped and allow at least three identification elements to be positioned within each of the detection areas 405a and 405b, e.g. one identification element in each leg of the L and a third identification element in the area where the legs meet.

Generally each of the detection areas may be implemented as read-write areas, as read-only areas or as write-only areas. For example, the provision of two read-only detection areas 405a,b facilitates two-player games or other types of games where two classes of virtual objects are to be distinguished, e.g. objects belonging to two different players, to two different teams, etc. The physical separation of the two detection areas thus provides an easy-to-use mechanism for a user to define members of the two classes of virtual objects by simply placing the corresponding identification toy element on a selected one of the detection areas 405a,b, where each detection area is associated with one of the classes. It will be appreciated that other embodiments may comprise additional detection areas, e.g. to define more than two classes of objects. It will further be appreciated that an identification of which of the detection areas an identification element is placed may be used to trigger other functions of the system that may at least in part depend on which detection area an identification is placed on.

In some embodiments, detection area 406 is selectively used for reading and writing from/to an identification element, but such that upon placement of an identification element on detection area 406, the processor either only reads data from the identification element or writes data to the identification element. For example, depending on the current state of the game or responsive to user input, the game system may operate the detection area 406 as a read-only detection area similar to the detection areas 405*a*, *b*. In other situations, e.g. when the user has selected a special configuration menu, the game system may operate the detection area as a write-only area so as to allow the user to create an association between a virtual object and an identification toy element placed within detection area 406. In another example, the identification element may comprise multiple memory areas and/r have stored thereon multiple types/categories of information. Upon placement of an identification element within detection area 405*a* or 405*b*, all memory areas and/or data categories may be read but not altered. Upon placement of an identification element within detection area 406 some memory areas and/or data categories may be read but not altered, while other memory areas may be written to but not read from.

Figure 6:
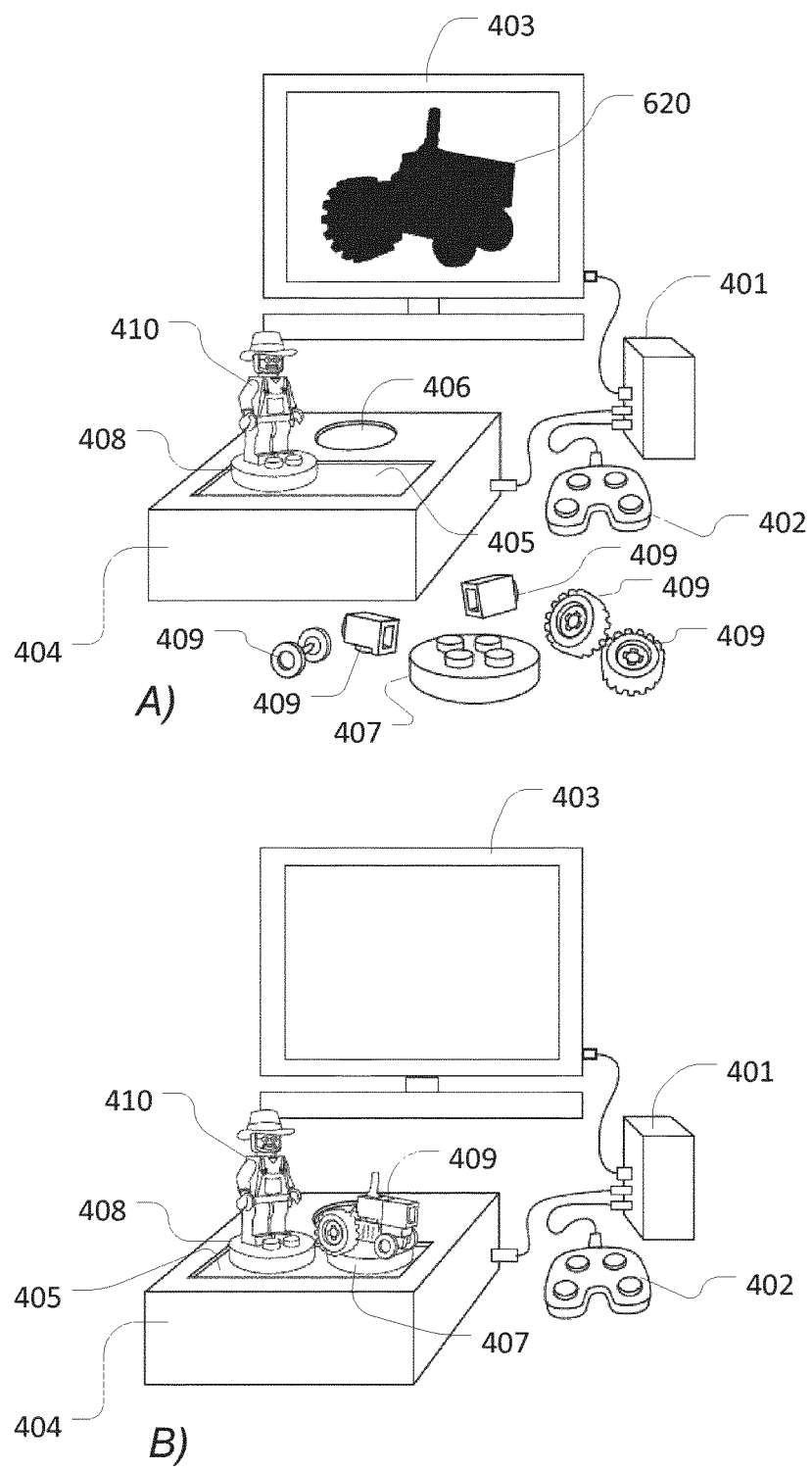
FIG. 6 illustrates an example of a use scenario of a game system as described herein.

FIG. 6 illustrates use of an embodiment of a game system, e.g. a game system as in FIG. 4 or similar thereto. In particular, the system of FIG. 6 comprises a computer 401, an input device 402 connected to the computer, a display 403 connected to the computer, a reader 404 connected to the computer, a number of identification toy elements 407, 408, and a number of toy construction elements 409, 410, all as described in connection with FIG. 4. It will be appreciated, however, that the described use may also be performed by the system of FIG. 5.

In this example one of the identification toy elements 408 has stored thereon information about a virtual character and the game system comprises a physical toy FIG. 410 resembling the virtual character. In an initial step, the user is instructed to assemble the toy FIG. 410 with the identification toy element 408. The computer 401 is configured to execute a video game program which comprises a corresponding virtual character that is controllable by a user via input device 402. When the user positions the identification toy element 408 on the detection area 405 of the reader, the computer detects the identification toy element, identifies the associated virtual character and causes the associated virtual character to appear in the video game. During game play where the user controls the virtual character, a game event may occur that unlocks certain equipment, in this example a tractor, which the virtual character may use during subsequent game play.

Responsive to the game event, the computer may provide an indication to the user that the user may obtain a virtual tractor (or another virtual object such as other equipment which the virtual character may utilise or otherwise engage in the game play). FIG. 5A shows the game system with the identification toy element 408 and attached toy FIG. 410 positioned within detection area 405 of the reader 404 and with an indication 620 of the unlocked virtual object displayed on display 403. Optionally, the computer may further provide building instructions for instructing the user how to construct a corresponding toy construction model resembling a tractor from the toy construction elements 409. The user may thus construct a toy construction model and attach it to another identification toy element 407 of the game system. When the user places the identification toy element 407 with the newly constructed model on the detection area 406 of the reader 404, the computer stores an identifier and/or other information indicative of the newly unlocked virtual object on the identification toy element 407. In some embodiments, this process may require the identification toy element 408 associated with the original virtual character to still be positioned in the detection area 405. The storing of the identification of the new virtual object on an identification toy element does not require the system to access the currently stored information on the identification toy element; hence detection area 406 may be a write-only area or at least be selectively operated as a write-only area.

Once the information about the new virtual object is successfully stored on identification toy element 407, the user may remove the identification toy element from the detection area 406. When the user subsequently places the identification toy element 407 on the detection area 405, e.g. together with the identification toy element 408, as illustrated in FIG. 5B, the computer 401 controls the video game so as to allow the user to control the virtual character associated with identification toy element 408 and to allow the virtual character to use or otherwise engage a virtual object associated with the identification toy element 407. For example, the virtual character may now be able to drive a virtual tractor. It will be appreciated that subsequently, the user may create and unlock further virtual objects in a manner similar to the one described above, and the virtual character may then use further equipment or other virtual objects. The further virtual objects may be associated with additional identification toy elements or the system may create a new association of the identification toy element 407 with a new virtual object, e.g. a larger tractor or different type of machine. Such new association may then replace the previous association. It will also be appreciated that, in some embodiments, the data processing system may use detection area 406 for reading data from identification elements, e.g. in a manner similar to detection area 405. For example, upon detection of a placement of an identification element within detection area 406, the data processing system may selectively operate the detection area 406 either as a read-only area or as a write-only area until the identification element is again removed from detection area 406. Upon subsequent placement of an identification element, the processing system may again determine/select, e.g. responsive to user input, game events and/or other conditions, whether to operate detection area 406 as a write-only or as a read-only area until the identification element is again removed from the detection area. It will be appreciated that the selective operation of detection area 406 in a read-only or in a write-only mode may also be implemented in an embodiment with more than two detection areas, e.g. in the embodiment described in connection with FIG. 4, 5 or 7.

FIG. 7 illustrates another example of a toy construction system. The system is similar to the system of FIG. 5, comprising a computer 401, an input device 402 connected to the computer, a display 403 connected to the computer, a reader 404 connected to the computer, a number of identification toy elements 407, 408, and a number of toy construction elements 409, 410, all as described in connection with FIG. 5. The system of FIG. 7 further comprises a scanner device 741 connected to the computer and adapted to scan the visual appearance of a physical object, e.g. a toy construction model constructed from toy construction elements and attached or attachable to a toy identification element. The scanning device may comprise a digital camera, a depth camera, a 3D scanner and/or anther suitable form of optical scanning device. The computer is configured to receive the scanning data from the scanning device, create a virtual object based on the received scanning data, e.g. having a visual appearance resembling the scanned physical object. When an identification toy element—e.g. an identification element with the physical object attached to it—is placed on detection area 406, the computer may be configured to associate the created virtual object with the identification element. Hence, when the same identification toy element is again placed on one of the detection areas 405a,b or 406, the computer may cause the associated virtual object with the appearance defined by the scanning data appear in a game or other virtual environment.

FIG. 8 shows schematic views of a reader for detecting identification elements and for reading and writing information from/to detected identification elements. In particular, FIG. 8A shows a top view of the reader while FIG. 8B shows a cross sectional view along line VI. The reader 404 comprises a processing unit 413, a first antenna A1 and a second antenna A2, and a third antenna A3, each antenna coupled to the processing unit 413 and each antenna being associated with one of the detection areas 405a, 406 and 405b, respectively. The processing unit 413 comprises and RFID detection circuit coupled to the antennas A1, A2 and A3. The RFID detection circuit is configured to detect whether an identification element in the form of an RFID tag is positioned within one of the detection areas. Alternatively, the processing unit 413 may comprise separate RFID detection circuits for each of the antennas. The processing unit 413 is further configured to read information from a detected identification tag and to forward the read information via data interface 223 to a data processor, such as computer of other data processing system. The processing unit 413 is further configured to receive information from a data processor via data interface 223 and to write the received information to a detected identification tag.

The antennas may be formed as respective antenna coils located below and parallel to a contact surface 229 defined by the reader; in this example the contact surface is a top surface of the housing of the reader onto which tags T1-T3 may be placed. A first detection area 405a is defined within the contact surface of the reader so that the coil antenna A1 encircles the first detection area such that the magnetic flux through the first detection area is surrounded by the coil A1. Similarly, antenna A2 is formed as an antenna coil located below and parallel to a contact surface 229 defined by the reader, and a second detection area 406 is defined within the contact surface of the reader so that the coil antenna A2 encircles the second detection area such that the magnetic flux through the second detection area is surrounded by the coil A2. Similarly, antenna A3 is formed as an antenna coil located below and parallel to a contact surface 229 defined by the reader, and a third detection area 405b is defined within the contact surface of the reader so that the coil antenna A3 encircles the second detection area such that the magnetic flux through the second detection area is surrounded by the coil A3.

The detection areas are defined within the contact surface 429 such that the detection areas do not overlap with each other and are separated from each other. The detection areas may be delimited from the remainder of the contact surface, e.g. by a different color, a boundary, as an elevated surface portion or as a recessed surface portion, or in another easily recognizable manner.

In the example of FIG. 8, three tags T1-T3, respectively, are placed on the contact surface of reader 440. Tag T1 is placed within the first detection area 405a, tag T2 is placed within the second detection area 406, while tag T3 is placed within the third detection area 405b. Hence, antenna A1 is operable to detect and read tag T1. Similarly, antenna A2 is operable to read tag T2 and antenna A3 is operable to read tag T3.

Generally, each antenna may emit an interrogation signal causing a tag within its detection range to respond with a response signal. In some embodiments, the interrogation signal may further provide operating power to the tag(s) within the detection range of the antenna, e.g. as in the case of detecting passive tags such as passive RFID tags. In some embodiments, a multiplexing scheme is employed where the antennas A1, A2 and A3 are activated alternatingly. Hence, the antennas may be alternatingly active in respective time windows of an activation cycle.

The position of the detected tags may thus be determined by the processing unit (or by an external processor) using the detection signals of the antennas A1, A2 and A3, respectively. It will be appreciated that, other embodiments may use a different number of antennas.

In some embodiments, the processing unit 413 may be configured to read information from an identification element only if the identification tag is detected in one or a subset of the detection areas, e.g. detection areas 405a and 405b. In other embodiments, the processing unit 413 may be configured to read information from an identification element regardless of which detection area the identification tag is detected in.

In some embodiments, the reader may be configured to store data in the memory of a detected tag. During the writing process, only one of the antennas is active. In some embodiments, the processing unit 413 may be configured to write information to an identification element only if the identification tag is detected in one or a subset of the detection areas, e.g. only detection area 406, thus implementing one or more read-only and/or one or more write-only detection areas. In some embodiments, the selective reading and/or writing of information to identification elements conditioned on which detection area the identification element has been detected in may be enforced by the external data processor. To this end, the reader may communicate to the data processor via data interface 223 which detection area is occupied by an identification element. In some embodiments, detection area 406 is selectively used for reading and writing from/to an identification element, but such that upon placement of an identification element on detection area 406, the data processor either only reads data from the identification element or writes data to the identification element. For example, the identification element may comprise multiple memory areas and/r have stored thereon multiple types/categories of information. Upon placement of an identification element within detection area 405a or 405b, all memory areas and/or data categories may be read but not altered. Upon placement of an identification element within detection area 406 some memory areas and/or data categories may be read but not altered, while other memory areas may be written to but not read from.

It will be appreciated that other embodiments of a reader may comprise more antennas so as to be able to distinguish more than three detection areas. As in the previous example, the antennas may be activated one-by-one in a cyclic pattern as described above for the case of two antennas.

It will be appreciated that other examples of readers may comprise different numbers and/or different geometrical arrangements and/or different types of antennas.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

What is claimed is:

1. A game system comprising:
   a data processing system and an identification element that includes information associated with the identification element;
   wherein the data processing system is configured to:
      detect a presence of the identification element within a detection area;
      create an association between a virtual object in a virtual environment and the detected identification element;
      access, when the identification element is again placed within a detection area, the information associated with the identification element;
      present a representation of the associated virtual object based on the accessed information;
      perform a play pattern procedure including controlling the representation of the virtual object;
      replace, responsive to a game event, the created association between the virtual object and the detected identification element with a second association between the identification element and a second virtual object; and
      present and control a representation of the second virtual object in the virtual environment upon detection of the detected identification element after the game event;
   wherein the game system further comprises:
      a detection device defining a first detection area and a second detection area, different from the first detection area;
      wherein the detection device is configured to access information associated with an identification element detected within the first detection area and to transmit information associated with an identification element to an identification element detected within the second detection area for storage of the transmitted information by the identification element;
      wherein the identification element comprises a memory for storing information relating to the game system;
      wherein the data processing is configured to detect a presence of the identification element within the first detection area and to receive information stored in the memory of the identification element when the identification element is placed within a first detection area;
      wherein the first detection area is a read-only detection area; and
      wherein the data processing system is configured to store data in the memory of the identification element when the identification element is placed within the second detection area.

2. The game system according to claim 1, wherein the data processing system is configured, responsive to a game event, to replace an existing association between the identification element and a virtual object with a new association between a new virtual object and the identification element such that the data processing system presents a representation of said new virtual object and performs a play pattern procedure including controlling the representation of the new virtual object when the data processing system again detects the presence of the identification element.

3. The game system according to claim 1, wherein the identification element is a toy construction element comprising one or more connectors configured for mechanically connecting one or more other toy construction elements to the identification element so as to allow a user to construct a toy construction model.

4. The game system according to claim 3, wherein the replacing step further comprises allowing a user to construct different toy construction models using the identification element, each toy construction model having a respective virtual object associated with it.

5. The game system according to claim 3, wherein the one or more toy construction elements are attached to the identification toy element when the identification toy element is positioned within the detection area of the game system.

6. The game system according to claim 1, further comprising a scanning device configured to acquire information indicative of the visual appearance of a physical object; wherein the data processing system is configured to create the virtual object with a representation based on the acquired information.

7. The game system according to claim 1, wherein the game system comprises a plurality of toy construction elements and wherein the data processing system is configured to present a graphical representation of the virtual object that resembles a toy construction model constructable from the plurality of toy construction elements.

8. The game system according to claim 1, wherein the information associated with the identification element includes an identifier of the identification element.

9. The game system according claim 1, wherein the identification element comprises a memory for storing the information associated with the identification element.

10. The game system according to claim 9, wherein the memory is a rewritable memory and wherein the memory is configured for storing information about the virtual object.

11. The game system according to claim 1, wherein the data processing system is configured to present building instructions for constructing, from a toy construction elements of the game system, a toy construction model resembling the virtual object.

12. The game system according to claim 1, further comprising a first and a second identification element each including information associated with the respective identification element;
   wherein the data processing system is configured to unlock/enable one or more new virtual objects responsive at least to detecting the first identification element;
   wherein the second identification element comprises one or more connectors configured for connecting one or more toy construction elements to the second identification element so as to allow a user to construct a toy construction model; and wherein the data processing system is configured to create an association between one of the unlocked virtual objects and the second identification element responsive at least to detecting the first identification element within a detection area and to detecting the second identification element within a detection area.

13. The game system according to claim 1, wherein the identification element is an identification toy element.

14. The game system according to claim 1, wherein the first detection area and the second detection area are each configured to receive at least one identification element, and the detection device being configured to detect which detection area an identification element is positioned in;
  wherein the detection device comprises at least one sensor for detecting a presence of an identification element;
  wherein the second detection area is shaped and sized to receive a single identification element of a predetermined type; and
  wherein the first detection area is shaped and sized to receive two or more of said identification elements.

15. The game system according to claim 1, wherein the data processing system is further configured to:
  identify a particular one of the detection areas as a detection area in which the identification element is positioned; and
  cause operation of one or more functions by the data processing system responsive at least to the identified detection area.

16. A game system comprising a data processing system and an identification element, the identification element comprising a memory for storing information relating to the game system;
  wherein the data processing system comprises a detection device defining a first detection area;
  wherein the data processing is configured to detect a presence of the identification element within the first detection area and to receive information stored in the memory of the identification element when the identification element is placed within the first detection area;
  wherein the first detection area is a read-only detection area; and
  wherein the detection device defines a second detection area, different from the first detection area, wherein the data processing system is configured to store data in the memory of the identification element when the identification element is placed within the second detection area.

17. The game system according to claim 16, wherein the at least one or more identification element and the first and second detection areas are shaped and sized such that each detection area is operable to receive each identification element.

18. The game system according to claim 16, wherein the data processing system is configured to send information to an identification element for storage only when said identification element is positioned within the second detection area and when another identification element is detected within the first detection area.

19. The game system according to claim 16, wherein the data processing system is configured, responsive to detecting an identification element within the second detection area, to selectively operate the second detection area in a read-only or in a write-only mode and to maintain the selected mode until the identification element is again removed from the second detection area.

20. The game system according to claim 19, wherein the data processing system is configured, responsive to detecting the identification element within the second detection area, to either select a read-only or a write only mode responsive to one or more of the following: a user input, a game event, a detection of an identification element within the first detection area, a detection of a predetermined category of identifications elements within the first detection area.

21. The game system according to claim 16, wherein the detection device is further configured for creating an association between a virtual object in a virtual environment and the detected identification element, the detection device being configured to detect which detection area an identification element is positioned in;
  wherein the detection device comprises at least one sensor for detecting the presence of the identification element;
  wherein the second detection area is shaped and sized to receive a single identification element of a predetermined type;
  wherein the first detection area is shaped and sized to receive two or more of said identification elements;
  wherein, responsive to a game event, the created association between the virtual object and the detected identification element is replaced with a second association between the identification element and a second virtual object; and
  wherein a representation of the second virtual object is presented and controlled in the virtual environment upon detection of the detected identification element after the game event.

22. The detection device according to claim 21, further comprising a third detection area shaped and sized to receive two or more of said identification elements.

23. A non-transitory computer-readable medium having stored thereon a computer program product comprising program code executed on the data processing system of the game system, wherein the program code is configured to cause the data processing system to:
  detect a presence of the identification element within a detection area
  create an association between a virtual object in a virtual environment and the detected identification element;
  access, when the identification element is again placed within a detection area, the information associated with the identification element;
  present a representation of the associated virtual object based on the accessed information;
  perform a play pattern procedure including controlling the representation of the virtual object;
  replace, responsive to a game event, the created association between the virtual object and the detected identification element with a second association between the identification element and a second virtual object; and
  present and control a representation of the second virtual object in the virtual environment upon detection of the detected identification element after the game event;
  wherein the game system further comprises:
  a detection device defining a first detection area and a second detection area, different from the first detection area;
  wherein the detection device is configured to access information associated with an identification element detected within the first detection area and to transmit information associated with an identification element to an identification element detected within the second detection area for storage of the transmitted information by the identification element;

wherein the identification element comprises a memory for storing information relating to the game system;

wherein the data processing is configured to detect a presence of the identification element within the first detection area and to receive information stored in the memory of the identification element when the identification element is placed within a first detection area;

wherein the first detection area is a read-only detection area; and wherein the data processing system is configured to store data in the memory of the identification element when the identification element is placed within the second detection area.

* * * * *